F. KIMBLE.
LOCKING DEVICE FOR AUTOMOBILES.
APPLICATION FILED JUNE 28, 1918.
1,300,735.
Patented Apr. 15, 1919.
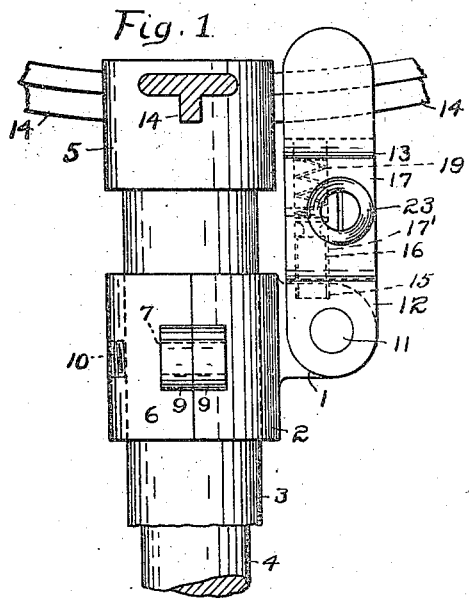
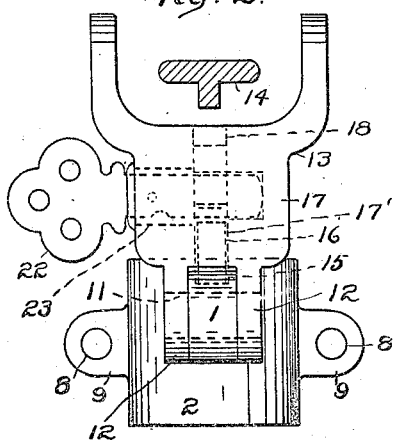
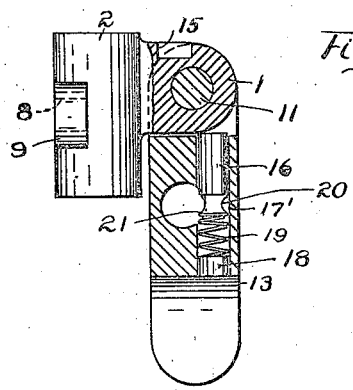
INVENTOR.
Frank Kimble
BY
ATTORNEY.

UNITED STATES PATENT OFFICE.

FRANK KIMBLE, OF FORT WAYNE, INDIANA, ASSIGNOR OF ONE-HALF TO NEWELL H. RANSOM, OF FORT WAYNE, INDIANA.

LOCKING DEVICE FOR AUTOMOBILES.

1,300,735.

Specification of Letters Patent.

Patented Apr. 15, 1919.

Application filed June 28, 1918. Serial No. 242,337.

*To all whom it may concern:*

Be it known that I, FRANK KIMBLE, a citizen of the United States, residing at Fort Wayne, in the county of Allen and State of Indiana, have invented new and useful Improvements in Locking Devices for Automobiles, of which the following is a specification.

My invention relates to locks for automobiles and its object is to produce a simple and effective lock permanently attached to the automobile by which the driver can quickly and easily lock the machine so as to prevent its being readily driven away by any person not having the proper key to unlock it, and which lock can be readily thrown out of action with the minimum of effort by the possessor of the proper key.

The invention is illustrated in the accompanying drawings in which the same reference characters designate like parts in all the figures, and in which drawings—

Figure 1 is a side elevational view of the device applied to the steering wheel of an automobile; Fig. 2 a front elevational view of the device, and Fig. 3 a side elevational view of the same partly in section.

Referring to the drawings the device consists of a support 1 carried by or integral with one member 2 of a clamp adapted to be fixed on the supporting sleeve 3 containing the shaft 4 of the steering wheel 5. The other member 6 of the clamp is adapted to engage the opposite side of the sleeve 3 and to be secured to member 2 by screws or rivets 7 engaged in apertures 8 in lateral lugs 9 on the members. A bolt 10 having threaded engagement with member 6 is tightened against sleeve 3 and secures the clamp to the sleeve. The heads of the screws and the bolt, after installed, are cut off so as to prevent their withdrawal by an unauthorized person, as shown in Fig. 1.

A pivot 11 is revolubly mounted in support 1 and projects laterally from opposite sides thereof, and upon the projecting ends of the pivot is secured the bifurcated end 12 of the yoke member 13 so that member 13 may be swung upwardly or downwardly on the pivot. The support will be fixed on the sleeve so that the yoke, when moved upwardly, will pass into the plane of wheel 5 and straddle a spoke 14 of the wheel.

A recess 15 is formed at a suitable point in the upper face of the rounded free end portion of the support 1 and a bolt 16 slidably supported in aperture 17' in the body 17 of the yoke member 13 is adapted to engage in the recess for locking the yoke member in upright position to the support and thereby prevent rotation of the steering wheel. A plug 18 closes the opposite end of aperture 17' and between the plug and the inner end of the bolt is spring 19 which tends to force the bolt out of aperture 17'. A notch or annular groove 20 is formed near the inner end of the bolt to provide a shoulder 21 upon which the lower portion of key 22 may be engaged to elevate the bolt and withdraw it from recess 15 for unlocking the device and releasing the wheel. Key 22 fits into a lock 23 of selected design and which, of course, will be different for each lock to avoid duplicates. When the yoke is in its locked position, the bolt 16 and its spring 19 and plug 18 are substantially concealed and protected against tampering between the support 1 and the spoke 14.

It will be noted that the outer end of the bolt is in contact with the periphery of the rounded portion of the support except when it is projected into recess 15 by spring 19, so that upon the withdrawal of the bolt from the recess the yoke member is moved downwardly with the end of the bolt bearing upon the rounded surface of the support and under the influence of the spring and is held tight at any position to which it may be moved. In practice the yoke member will be moved down to the position shown in Fig. 3 where it will be out of the way and from which position it can be readily moved into its active position and as soon as the bolt registers with recess 15 spring 19 instantly forces it into the recess and locks the wheel to the sleeve. The key is used only to unlock the device.

I contemplate adapting the invention to various makes and styles of automobiles and hence shall require various forms of means for securing the support for the yoke member to the steering post of the machine. The clamp illustrated in the drawings is one such means and will suffice for a large number of different makes of machines.

What I claim is:

In a locking device for automobiles, the combination with a steering wheel, steering shaft and steering column, of a support rigidly secured to the steering column and having a rounded free end with a recess in its upper surface, a yoke pivotally mounted on the support and adapted to be swung upwardly on its pivot to cause it to embrace one of the spokes of the steering wheel, a spring pressed bolt reciprocably mounted in the yoke in frictional engagement with and adapted to slide on the rounded face of the support as the yoke is swung upwardly or downwardly and to seat within the said recess when the yoke is in its uppermost position embracing the spoke with the bolt positioned endwise between the support and spoke to prevent tampering, and a lock and key in the yoke adapted to withdraw the bolt from the recess to permit the yoke to be swung downwardly on its pivot.

In witness whereof I have hereunto signed my name this 21st day of June, 1918.

FRANK KIMBLE.